Patented Sept. 4, 1945

2,384,102

UNITED STATES PATENT OFFICE 2,384,102

AROMATIC AMINE-N-PENTAPYRANOSIDES AND PROCESS FOR THE MANUFACTURE OF SAME

John Lee, Essex Fells, Ulrich V. Solmssen, Clifton, and Leo Berger, Nutley, N. J., assignors to Hoffmann-La Roche, Inc., Nutley, N. J., a corporation of New Jersey No Drawing. Application September 30, 1943,
Serial No. 504,442

13 Claims. (Cl. 260—211)

Our invention relates to a method of producing N-pentosides from sugars and primary amines which method proceeds under hitherto untried reaction conditions, and which results in the formation of a new class of aromatic N-pentosides possessing properties which we have found to be useful, inter alia, in the manufacture of riboflavin.

N-glucosides are known to be formed when heating together sugars and primary amines with or without liquid reaction medium, but we have discovered, quite unexpectedly, even when bringing these reactants together at substantially room temperatures in a liquid medium, that condensation occurs smoothly and products are obtained which have distinctly different properties from the known heat-condensed N-glucosides rendering them capable of various practical uses in industry.

Our new compounds are formed by reacting sugar and primary amine together in aqueous solution containing a quantity of water-miscible organic solvent at least sufficient for partial dissolution of the amine. The reaction is performed substantially at room temperature, followed if necessary by slight heating and/or cooling in order to complete the reaction and promote crystallization. The pH of the solution is adjusted to the range of from about 2 to about 8 before adding the amine, the preferred pH being around 4.0.

We have thus obtained new aromatic amine N-pentosides of the probably general formula:

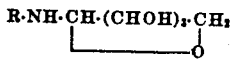

wherein R is a cyclic residue such as benzene or naphthalene which may be substituted by a further group or groups which are non-reactive with pentoses under the conditions of the reaction, such as alkyl, alkoxy, hydroxy, nitro, halogen, carboxyl, carbalkoxy groups, such as, for example, phenyl, naphthyl, tolyl, xylyl, methoxyphenyl, hydroxyphenyl, nitrophenyl, chlorophenyl, carboxyphenyl, carbethoxyphenyl.

We have found that the new compounds are, in part, especially characterized by their ability to form complexes with soluble salts of alkali metals or ammonium which separate from aqueous alcoholic solutions and which contain the desired pentoside in a loose combination with the alkali metal salt used. We have found this ability to form these complexes to be especially true of those sugars which have the hydroxyls in 2- and 3-position in cis configuration; for example, ribose and lyxose yield complexes in very high yield. The free pentosides can be isolated from the complexes by extraction with a suitable solvent, as, for example, dioxane and pyridine.

The new compounds can be acylated to form triacyl derivatives which correspond to the probable general formula:

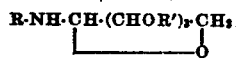

wherein R has the signification given to it in the above general formula for our new N-pentosides, and wherein R' is an acyl residue, such as formyl, acetyl, propionyl, butyryl or benzoyl. By blocking off the 2-, 3- and 4-positions of our N-pentosides in this fashion, our invention provides an approach to the substitution of the 5-position on pentoses, and thus forms a valuable tool for the furtherance of the scientific study of pentoses.

Also, in our copending applications, Ser. Nos. 503,443 and 504,444, filed of even date herewith, we have described and claimed a process whereby our new N-pentosides and the aforementioned triacyl derivatives can be hydrolyzed smoothly to yield the free sugars or triacylated sugars by heating the pentosides in an aqueous solution which may be acidified with a weak organic acid of the class of lower fatty acids as, for example, formic, acetic, or propionic acid. On the removal of the amine by steam distillation or other means, the aqueous solution on evaporation yields the sugar in good yield. Furthermore, our N-pentosides and the triacyl derivatives can be hydrogenated whereby, from the latter, a new class of triacylribitylaminobenzenes is obtained, described and claimed in our copending application, Ser. No. 504,445, filed of even date herewith.

The study by the prior art of reaction conditions under which sugars and primary amines will condense into N-glucosides was limited to the use of heat as an essential reaction promoter. As far as we know, it did not occur to the previous investigators that condensation might take place at ordinary temperatures and lead to the useful results described by us.

For instance, Kuhn and Stroebele in Ber. 70, 773 (1937) describe o-nitraniline glucosides which they obtained from 2-nitro-4,5-dimethyl aniline and L-arabinose or d-ribose by heat condensation in alcohol in the presence of ammonium chloride as catalyst. The authors emphasize that the nitro group in ortho position impedes the condensability of aniline, and that while aniline, toluidine, phenitidine and the like are known to react readily with pentoses and hexoses by heating in alcoholic solution to form N-glucosides, no formation of glucosides occurs under the same conditions with o-nitraniline and 2-nitro-4,5-dimethyl aniline, unless ammonium chloride is present as catalyst.

We have discovered that o-nitraniline readily condenses at ordinary temperatures with d-ribose to form an N-pentoside.

The following examples illustrate our invention:

*Example 1*

1.44 g. crystalline D-ribose is dissolved in 20 cc. distilled water. The pH is adjusted to 4.0 with 3N $H_2SO_4$. 1.0 cc. aniline in 10 cc. absolute alcohol is added and the mixture stirred at 25° for 10 minutes. It is then set in the refrigerator overnight. (Crystallizes out in 1 hour.) The crystalline precipitate is then filtered off and washed with cold alcohol and ether. The product presumably is alpha-aniline-N-d-ribopyranoside, forming colorless shining platelets. The product contains 0.5 mol $H_2O$. Yield 2.07 g. (96% theory), M. P. 125–7°.

$$[\alpha]_D^{24} = +63.4° \rightarrow +48.6°$$

($c=1.0$ in pyridine). The product analyzes as follows:

| Calculated | Found |
|---|---|
| C = 56.41 | 56.71 |
| H = 6.84 | 6.77 |
| N = 5.98 | 5.78 |

Under certain conditions the product may crystallize with different amounts of solvent of crystallization. This causes variations in melting point and rotation, but when the latter is corrected on the basis of the above compound, it corresponds.

In a manner similar to the above, by replacing aniline with o-chlor aniline the following compound is obtained:

α-o-chlor aniline-N-d-ribopyranoside

M. P. 152–3° $[\alpha]_D^{28°} = +136° \rightarrow +125°$ ($c=1.7\%$ sol. in pyridine [3 days]); by replacing aniline with o-nitro aniline, the following compound is obtained:

o-nitro aniline-N-d-ribopyranoside

M. P. 183–5° with decomp. $[\alpha]_D^{28°} = -109°$ ($c=1\%$ in pyridine); by replacing aniline with p-aminobenzoic acid, the following compound is obtained:

α-p-carboxy aniline-N-d-ribopyranoside·$2C_2H_5OH$

M. P. 129–30° with decomp.

$$[\alpha]_D^{28°} = +231° \rightarrow +70.2°$$

($c=3.3\%$ in pyridine [3 days]); by replacing aniline with p-toluidine, the following compound is obtained:

p-methyl aniline-N-d-ribopyranoside·$2C_2H_5OH$

M. P. 102–3° with decomp. $[\alpha]_D^{27.5°} = +53.2°$ ($c=2\%$ in pyridine); by replacing aniline with p-anisidine, the following compound is obtained:

α-p-methoxy aniline-N-d-ribopyranoside

M. P. 109–10° with decomp.

$$[\alpha]_D^{27.5°} = +122° \rightarrow +40.8°$$

($c=1.8\%$ in pyridine [2 days]); by replacing aniline with m-hydroxy-p-methylaniline, the following compound is obtained:

α-m-hydroxy-p-methylaniline-N-d-ribopyranoside

M. P. 133–5° with decomp.

$$[\alpha]_D^{27°} = +116° \rightarrow +32.4°$$

($c=1\%$ in pyridine [24 hours]); by replacing aniline with α-naphthylamine, the following compound is obtained:

α-(1-naphthylamine)-N-d-ribopyranoside

M. P. 146–7° $[\alpha]_D^{29°} = +122.0° \rightarrow +29.2°$ ($c=2.5$ in pyridine [48 hours]).

*Example 2*

1.39 g. ribose is dissolved in 25 cc. of a 9% $Na_2SO_4$ solution and then 7.0 cc. absolute alcohol is added. The pH is adjusted to 4.0 with 3N $H_2SO_4$. 1.0 cc. aniline in 5.5 cc. absolute alcohol is then added with stirring. The mixture is stirred at 25° for 1 hour and then set in the ice-box at +5° overnight. Complex is filtered off, and stirred in 10 vol. absolute alcohol and then filtered. It is dried in vacuo at 25° C. Yield 3.9 g. complex. Contains 1.81 g. α-aniline-N-d-ribopyranoside (based on sugar titration and extraction). 87.5% yield.

To form the complex the following salts were also used: $K_2SO_4$, $Li_2SO_4$, $NaH_2PO_4 \cdot H_2O$, $NaNO_3$, $NH_4Cl$, $Na_2B_4O_7$, Na acetate, and the like.

On extracting the above complex with acetone and filtering, the pure α-aniline-N-d-ribopyranoside of Example 1 is obtained.

On extracting the above complex with dioxane, filtering and adding $CCl_4$, α-aniline-N-d-ribopyranoside with varying amounts of dioxane of crystallization is obtained.

*Example 3*

1.44 g. crystalline D-ribose is dissolved in 20 cc. distilled water and the pH adjusted to 4.0 with 3N $H_2SO_4$. 1.3 g. xylidine dissolved in 10 cc. absolute alcohol is then added and the mixture stirred at 25° for 10 minutes. It is then set aside in the refrigerator for crystallization. The product occurs as colorless crystals. Yield 1.2 g. M.P. 110–12° (49% yield). $[\alpha]_D^{25} = +94.5° \rightarrow +53.0°$ ($c=1.0$ in pyridine).

*Example 4*

20 ltrs. electrolyte obtained from electrolytic reduction of D-ribonolactone containing 1520 g. sodium sulfate and 2320 g. d-ribose are adjusted to pH 4.0 and 7.5 ltrs. alcohol added. To this a solution of 1580 g. technical aniline in 4000 cc. alcohol is added. The pH now rises to 5.6 and the aniline-D-ribopyranoside-sodium sulfate complex precipitates almost immediately. It is allowed to stand 12 hours in an ice-box, centrifuged, resludged with alcohol and again centrifuged. The product shows, on titration with Fehling's solution, the equivalent of 1977 g. of D-ribose.

The dry complex on extraction with acetone or dioxane yields pure α-aniline-N-d-ribopyranoside, as described in Example 1.

*Example 5*

An aqueous solution of 8.5 kg. D-ribose in a volume of 90–100 ltrs. obtained by electrolytic reduction of d-ribonolactone is saturated with sodium sulfate, and 38 ltrs. of alcohol is added. The pH is adjusted to 4.2 and 22.6 ltrs. of an alcoholic solution containing 7.54 kg. of 3,4-dimethylaniline is added with stirring. After a few moments the pH reaches 5.6 to 5.8 and a heavy precipitation occurs, the pH further increasing from 6.0 to 6.2. The stirring is continued for about ½ hour with external cooling to bring the liquid to about 0° C. After an additional 2-hour stirring, the mixture is resludged and centrifuged, removed from the centrifuge, resludged in about 60 ltrs. of alcohol and recentrifuged. The product consists of α-3,4-dimethylaniline-N-d-ripopyranoside-sodium sulfate complex, and it analyzes as follows:

|   | Calculated | Found |
|---|---|---|
| C | 42.95 | 44.08 |
| H | 5.80 | 6.00 |
| N | 3.94 | 4.07 |
| Na | 7.96 | 7.96 |

By extraction with acetone or dioxane, pure α-3,4-dimethylaniline-N-d-ribopyranoside with the following characteristics is obtained:

$$[\alpha]_D^{23°} = +94.5° \rightarrow +53.0°$$

($c = 1.0$ in pyridine), M. P. 110–12° C.

Example 6

14.0 g. of α-aniline-N-d-ribofuranoside is dissolved in 150 cc. of dry pyridine, cooled to 0° C., and 28.7 g. of benzoyl chloride is added slowly with stirring. The acylation starts in 15–20 minutes and pyridine hydrochloride starts to precipitate out. Upon completion of the addition, the reaction mixture is kept at room temperature for a day and worked up in the manner described in Example 8.

A quantitative yield of a yellowish brittle solid which cannot be crystallized is obtained. The product does not melt but liquifies ca. 50°.

Example 7

12.0 g. of α-aniline-N-d-ribopyranoside is dissolved in 100 cc. of dry pyridine, cooled to 0° C., and 36 cc. of acetic anhydride added slowly with stirring. Upon completion of the addition the reaction is kept at room temperature for a day. A further heating at 40–50° C. for 1 hour completes the reaction.

It is worked up as described in Example 8.

Yield 14.0 g. of a hard yellow-orange glass which cannot be crystallized but analyzes correctly for the desired product.

Example 8

6.0 g. of α-aniline-N-d-ribofuranoside is dissolved in 50 cc. of dry pyridine, cooled to 0° C. and 18 cc. of acetic anhydride added slowly with stirring. Upon completion of the addition the reaction product is kept at room temperature for a day. One hour's heating at 40–50° completes the reaction.

The reaction mixture is poured into 250 cc. of cold water and the syrupy mass that separates out is extracted with ether. The ether solution is washed neutral, dried overnight over anhydrous sodium sulfate. The solvent is then removed. The resultant product is a hard yellowish glass at room temperature, which flows at 60°. The yield is 8.3 g.

Example 9

14.0 g. of α-aniline-N-d-ribopyranoside is dissolved in 150 cc. of dry pyridine, cooled to 0°, and 28.7 g. of benzoyl chloride is added slowly with stirring. The acylation proceeds slowly. Reaction starts in about 35–40 minutes—pyridine hydrochloride starts to precipitate out. Upon completion of the addition the reaction product is kept at room temperature for a day and worked up in the usual manner.

The product is a yellowish sticky glass which does not crystallize. The yield is quantitative.

Example 10

5 g. of D-arabinose is dissolved in 35 cc. water, and 4 cc. aniline dissolved in 15 cc. alcohol are added. The mixture is set aside at 50° C. for 2 days, then evaporated to dryness in vacuo at 35° C. The residual syrup is crystallized from alcohol and ether mixture. 3.5 g. of the α-aniline-N-d-arabinopyranoside having the following characteristics are obtained:

M. P. 130°    Colorless prisms (a) $[\alpha]_D^{29} = +8.9° \rightarrow -13.2°$ ($c = 1.9\%$ in methanol (48 hours))

(b) $[\alpha]_D^{29} = +68° \rightarrow -4.3°$ ($c = 3\%$ in pyridine [24 hours])

This material differs from the aniline arabinoside prepared by Hanaoka, J. Biochem. 31, 95 (1940), who shows a compound of the following characteristics:

M. P. 130°    Colorless plates
$[\alpha]_D^{20} = +34.0° \rightarrow +2.5°$ ($c = 1.0$ in methanol)

By repetition of the method described by Hanaoka, we find the material to form in colorless plates, having a melting point of 130°.

(a) $[\alpha]_D^{29} = +27.4° \rightarrow -8.0°$ ($c = 1.6$ in methanol (25 hours))

(b) $[\alpha]_D^{29} = +82° \rightarrow +1.48°$ ($c = 2.0$ in pyridine (24 hours))

Furthermore, by following the procedure described α-[β-naphthylamine]-N-d-ribopyranoside, α-tribenzoylaniline-N-d-ribopyranoside, α-triacetyl-3,4-dimethylaniline-N-d-ribopyranoside and their complexes with sodium sulfate, sodium chloride, sodium citrate, ammonia chloride, sodium acetate, sodium hydrogen phosphate and their l-modifications may also be made.

We believe that our new compounds are N-pento-pyranosides as indicated in the above general formula, and that the N-pentosides hitherto described in the literature are N-furanosides of the general formula:

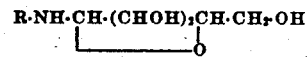

wherein R would be the aromatic residue.

We wish it to be understood, however, that the names which we have given to the compounds are provisional, but nevertheless in accordance with the best evidence that we were able to obtain. In any event the examples strikingly demonstrate the different chemical and physical characteristics of our cold-condensed N-pentosides from the heat-condensed N-pentosides of the prior art.

Thus, the compound formed by the heating together of ribose and 3,4-dimethylaniline in alcoholic solution, as described by Kuhn and Birkofer, Ber. 71, 629 (1938), has M. P. 128–130° and the rotation $[\alpha]_D^{21°} = +172°$ ($c = 0.5$ in pyridine). The compound prepared by us, as described in Example 5, has the following characteristics:

$$[\alpha]_D^{25°} = +94.5° \rightarrow +53.0°$$

($c = 1.0$ in pyridine), M. P. 110–12°. We have repeated the compound described by Kuhn and Birkofer, and find the chemical characteristics as follows: $[\alpha]_D^{24°} = 171.7° \rightarrow +56.5°$, M. P. 128–30°

(c=0.5 in pyridine). In view of this mutarotation and the acylation experiments described above, we regard the compound described by Kuhn et al. as α-xylidine-N-ribofuranoside; similarly, because of the direction of mutarotation, we regard our new compound as the α-xylidine-N-ribopyranoside. Likewise, from other aromatic amines, as for example aniline, we obtain ribosides which are different from those prepared under the conditions of the reaction described by Kuhn et al.

The new N-pentosides form triacyl compounds, as pointed out above, for instance triacetyl and tribenzoyl derivatives. The rate of benzoylation of the new compound derived from ribose and aniline by our new method is slower than the rate of benzoylation of the aniline riboside prepared by the previously known methods. This leads us to assign a designation of ribofuranosides to the previously known compounds and of ribopyranosides to the new compounds.

Our new compounds are not so-called Amadori rearrangement products of the type discovered by Kuhn et al., as shown by the fact that they do not decolorize alkaline solutions of dichlorophenol-indophenol, and that on reduction they give the N-pentitylamines corresponding to the sugar from which the pentoside was made; for example, α-3,4-dimethyl-d-ribopyranoside yields d-ribitylxylidine on reduction instead of d-arabitylxylidine as would be expected if an Amadori rearrangement had occurred.

As pointed out, adjustment of the pH of the solutions to the range of from 2 to 8 before adding the amine is desirable, the preferred pH being around 4.0. At lower pH the aromatic amine tends to form salts which crystallize along with the pyranoside. In pH range higher than that given by a solution of the amine itself in aqueous alcoholic solution, the tendency to hydrolyze will reduce the yield or even inhibit entirely the formation of the pyranoside. For the formation of the pyranoside-salt complexes a solvent consisting of 30% alcohol is preferable, since at alcohol concentrations above or below the mixture is not homogeneous. Alcohol concentrations may be as low as 5%. In place of alcohol other water-miscible solvents, such as acetone or dioxane, may be used.

Our new aromatic N-pentosides are characterized by ease of formation, especially by the fact that they crystallize directly in good yield and are easily separated from the solution in which they are formed by the addition of soluble alkali metal or ammonium salts. For example, α-aniline-N-d-ribo-pyranoside crystallizes practically quantitatively from solution, and the corresponding α-3,4-xylidine-N-d-ribopyranoside separates from solution at room temperature with the addition of a salt. This strong tendency to separate from solution is apparent even when the solutions of the sugar are relatively impure. The new aromatic amine-pentosides therefore form useful intermediates for the manufacture of pure sugars.

In the above description of our invention, by N-ribopyranoside we mean the riboside formed from the D, L or DL form of the sugar. We also intend that our invention cover that α and β forms of pyranoside since it is obvious that whilst the sugars are characterized as α forms, during the mutarotation that we have described the β form is in equilibrium with the α form. By the designation α we mean ribosides which have an optical rotation which on mutarotation becomes more negative.

While we have described our invention in considerable detail, it is apparent that variations of the invention may be made without departing from the spirit and scope thereof, and it is understood that we do not limit ourselves to the specific embodiments thereof except as defined in the appended claims.

What we claim is:

1. Aniline-N-α-d-riboside corresponding to the formula:

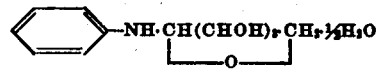

2. 3,4-dimethylaniline-N-α-d-riboside corresponding to the formula:

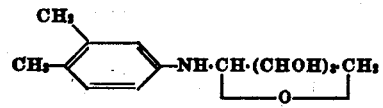

3. The process of manufacturing an aromatic amine N-pentoside corresponding to the formula:

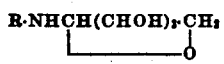

wherein R is an aromatic radical which process comprises reacting a primary aromatic amine of the formula R·NH₂ wherein R has the above signification, with a pentose in aqueous solution in presence of a water-miscible organic solvent at least sufficient for partial dissolution of the amine substantially at room temperature and at a pH of from about 2 to about 8.

4. The process of manufacturing an aromatic amine N-pentoside corresponding to the formula:

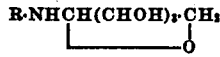

wherein R is an aromatic radical which process comprises reacting a primary aromatic amine of the formula R·NH₂ wherein R has the above signification, with a pentose in aqueous alcoholic at least sufficient for partial dissolution of the amine substantially at room temperature and at a pH of from about 2 to about 8, in the presence of a salt selected from the group consisting of water-soluble salts of an alkali metal and ammonia.

5. The process of manufacturing an aromatic amine N-pentoside corresponding to the formula:

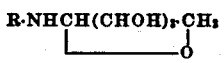

wherein R is an aromatic radical which process comprises reacting a primary aromatic amine of the formula R·NH₂ wherein R has the above signification, with a pentose in aqueous alcoholic solution at least sufficient for partial dissolution of the amine substantially at room temperature and at a pH of from about 2 to about 8, in the presence of a salt selected from the group consisting of water-soluble salts of an alkali metal and ammonia, separating the complex formed by filtration and extracting of the complex with a solvent for the N-pentoside.

6. The process of manufacture of α-3,4-dimethylaniline-N-d-riboside of the formula:

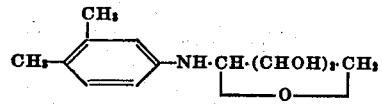

which comprises reacting 3,4-dimethylaniline with ribose in aqueous alcoholic solution substantially at room temperature in the presence of a water-soluble salt selected from the group consisting of alkali metal salts and ammonia and at a pH of from about 2 to about 8.

7. The process of manufacture of α-3,4-dimethylaniline-N-d-riboside of the formula:

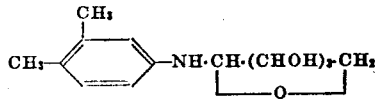

which comprises reacting 3,4-dimethylaniline with ribose in aqueous alcoholic solution substantially at room temperature in the presence of sodium sulfate and at a pH of from about 2 to about 8.

8. The process of manufacture of α-3,4-dimethylaniline-N-d-riboside of the formula:

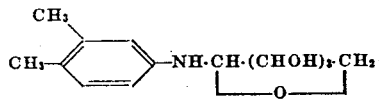

which comprises reacting 3,4-dimethylaniline with ribose in aqueous alcoholic solution substantially at room temperature in the presence of sodium sulfate and at a pH of from about 2 to about 8, separating the complex by filtration and extracting the complex with a solvent for the riboside.

9. The process of manufacture of aniline-N-α-d-riboside of the formula:

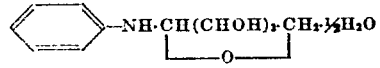

which comprises reacting aniline with ribose in aqueous alcoholic solution substantially at room temperature in the presence of a water-soluble salt selected from the group consisting of alkali metal salts and ammonia and at a pH concentration of from about 2 to about 8.

10. A complex compound of the aromatic amine N-pentoside corresponding to the formula

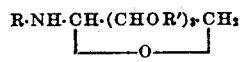

with a soluble salt selected from the group consisting of alkali metal salts and ammonium salts, wherein R is an aromatic radical, and R' is a radical selected from the group consisting of hydrogen and acyl.

11. A complex compound of the aromatic amine N-pentoside corresponding to the formula

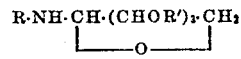

with a soluble salt selected from the group consisting of alkali metal salts and ammonium salts, wherein the hydroxyls in 2- and 3- position of the pentose radical are in cis configuration, and wherein R is an aromatic radical, and R' is a radical selected from the group consisting of hydrogen and acyl.

12. The complex compound of alpha-aniline-N-D-ribopyranoside with sodiumsulfate.

13. A compound selected from the group consisting of aromatic amine N-pentosides corresponding to the following general formula

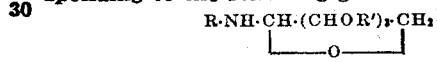

wherein R is an aromatic radical and R' is a radical selected from the group consisting of hydrogen and acyl, and soluble alkali metal and ammonium salts of these pentosides.

JOHN LEE.
ULRICH V. SOLMSSEN.
LEO BERGER.